United States Patent
Ikawa

(10) Patent No.: US 8,271,919 B2
(45) Date of Patent: Sep. 18, 2012

(54) METHOD FOR CORRECTING IMAGE RENDERING DATA, METHOD FOR RENDERING IMAGE, METHOD FOR MANUFACTURING WIRING BOARD, AND IMAGE RENDERING SYSTEM

(75) Inventor: Yuji Ikawa, Ogaki (JP)

(73) Assignee: Ibiden Co., Ltd., Ogaki-shi (JP)

( * ) Notice: Subject to any disclaimer, the term of this patent is extended or adjusted under 35 U.S.C. 154(b) by 88 days.

(21) Appl. No.: 12/841,200

(22) Filed: Jul. 22, 2010

(65) Prior Publication Data

US 2011/0107279 A1    May 5, 2011

Related U.S. Application Data

(60) Provisional application No. 61/256,702, filed on Oct. 30, 2009.

(51) Int. Cl.
G06F 17/50    (2006.01)
(52) U.S. Cl. .................................................. 716/110
(58) Field of Classification Search ............ 716/100, 716/110
See application file for complete search history.

(56) References Cited

U.S. PATENT DOCUMENTS

| | | | | |
|---|---|---|---|---|
| 8,079,716 B2* | 12/2011 | Aso | ................ | 353/69 |
| 2003/0062479 A1* | 4/2003 | Kametani et al. | ............ | 250/310 |
| 2007/0165283 A1* | 7/2007 | Matsuzaki et al. | ........... | 358/3.26 |
| 2009/0040396 A1* | 2/2009 | Aso | ................ | 348/744 |
| 2009/0142004 A1* | 6/2009 | Gentner et al. | ............... | 382/294 |
| 2009/0171609 A1* | 7/2009 | Takane | ........................ | 702/94 |
| 2012/0063698 A1* | 3/2012 | Aso | ................ | 382/275 |

FOREIGN PATENT DOCUMENTS

| | | |
|---|---|---|
| JP | 2008-003441 | 1/2008 |
| JP | 2008-003504 | 1/2008 |

* cited by examiner

Primary Examiner — Suchin Parihar
(74) Attorney, Agent, or Firm — Oblon, Spivak, McClelland, Maier & Neustadt, L.L.P.

(57) ABSTRACT

A method for correcting image rendering data includes preparing image rendering data having position coordinates that determine an image rendering region and base position coordinates that show the position of a base point arranged in the image rendering region; obtaining a displacement state of position coordinates on an image rendering object; based on the obtained displacement state of position coordinates on the image rendering object, correcting the base position coordinates; and based on the corrected base position coordinates, correcting the position coordinates of the image rendering region while the shape of the image rendering region is maintained.

12 Claims, 13 Drawing Sheets

METHOD FOR CORRECTING IMAGE RENDERING DATA, METHOD FOR RENDERING IMAGE, METHOD FOR MANUFACTURING WIRING BOARD, AND IMAGE RENDERING SYSTEM

CROSS-REFERENCE TO RELATED APPLICATIONS

The present application claims the benefits of priority to U.S. Application No. 61/256,702, filed Oct. 30, 2009. The contents of that application are incorporated herein by reference in their entirety.

BACKGROUND OF THE INVENTION

1. Field of the Invention

The present invention relates to a method for correcting image rendering data to render an image on an image rendering object according to the image rendering data, a method for rendering an image, a method for manufacturing a wiring board, and an image rendering system.

2. Discussion of the Background

In Japanese Laid-Open Patent Publication 2008-3441, an image rendering system is described. In such an image rendering system, four alignment marks, which structure vertices of the image rendering region (a base rectangle) on image rendering data, are formed on a substrate (an image rendering object). Then, such an image rendering system measures the positions of the alignment marks of the substrate when the substrate is deformed, and obtains the deformation state of the substrate from the measured positions of the alignment marks. Then, by deforming the image rendering region according to the deformation state of the substrate, position coordinates of the image rendering data will be corrected.

Also, in Japanese Laid-Open Patent Publication 2008-3504, another image rendering method is described. In such an image rendering system, four alignment marks, which structure vertices of the image rendering region (a base rectangle) on image rendering data, are formed on a substrate (an image rendering object). Then, such an image rendering system measures the positions of the alignment marks of the substrate when the substrate is deformed, and from the measured positions of the alignment marks, obtains the scale ratio for each of multiple divided regions which structure the image rendering region before and after such regions are deformed. Then, by correcting each divided region to a rectangle according to its scale ratio before and after the deformation of each divided region, position coordinates of the image rendering data will be corrected.

The contents of Japanese Laid-Open Patent Publication Nos. 2008-3441 and 2008-3504 are incorporated herein by reference in their entirety.

SUMMARY OF THE INVENTION

A method for correcting image rendering data according to one aspect of the present invention includes the following: preparing image rendering data having position coordinates that determine an image rendering region and base position coordinates that show the position of a base point arranged in the image rendering region; obtaining a displacement state of position coordinates on an image rendering object; based on the obtained displacement state of position coordinates on the image rendering object, correcting the base position coordinates; and based on the corrected base position coordinates, correcting the position coordinates of the image rendering region while the shape of the image rendering region is maintained.

An image rendering system according to another aspect of the present invention includes the following: an image-rendering-data device which sets image rendering data having position coordinates that determine an image rendering region and base position coordinates that show the position of a base point arranged in the image rendering region; a displacement-state determination device which obtains a displacement state of position coordinates on an image rendering object; a base-position-coordinate correction device which corrects the base position coordinates according to the obtained displacement state of the position coordinates on the image rendering object; and a position-coordinate correction device which corrects the position coordinates of the image rendering region according to the corrected base position coordinates while the shape of the image rendering region is maintained.

A method for correcting image rendering data according to yet another aspect of the present invention includes the following: preparing image rendering data having position coordinates that determine each of multiple pieces structuring an image rendering region and base position coordinates that show a base point arranged in each of the pieces; obtaining a displacement state of the position coordinates on the image rendering object; correcting the base position coordinates of each of the pieces according to the obtained displacement state of the position coordinates on an image rendering object; and correcting the position coordinates of each of the pieces according to the corrected base position coordinates while the shape of each of the pieces is maintained.

An image rendering system according to still another aspect of the present invention includes the following: an image rendering data device which sets image rendering data having position coordinates that determine each of multiple pieces structuring an image rendering region and base position coordinates that show the position of a base point arranged in each of the pieces in the image rendering region; a displacement state determination device which obtains a displacement state of position coordinates on an image rendering object; a base-position-coordinate correction device which corrects the base position coordinates of each of the pieces according to the obtained displacement state of the position coordinates on the image rendering object; and a position coordinate correction device which corrects the position coordinates of each of the pieces according to the corrected base position coordinates while the shape of each of the pieces is maintained.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
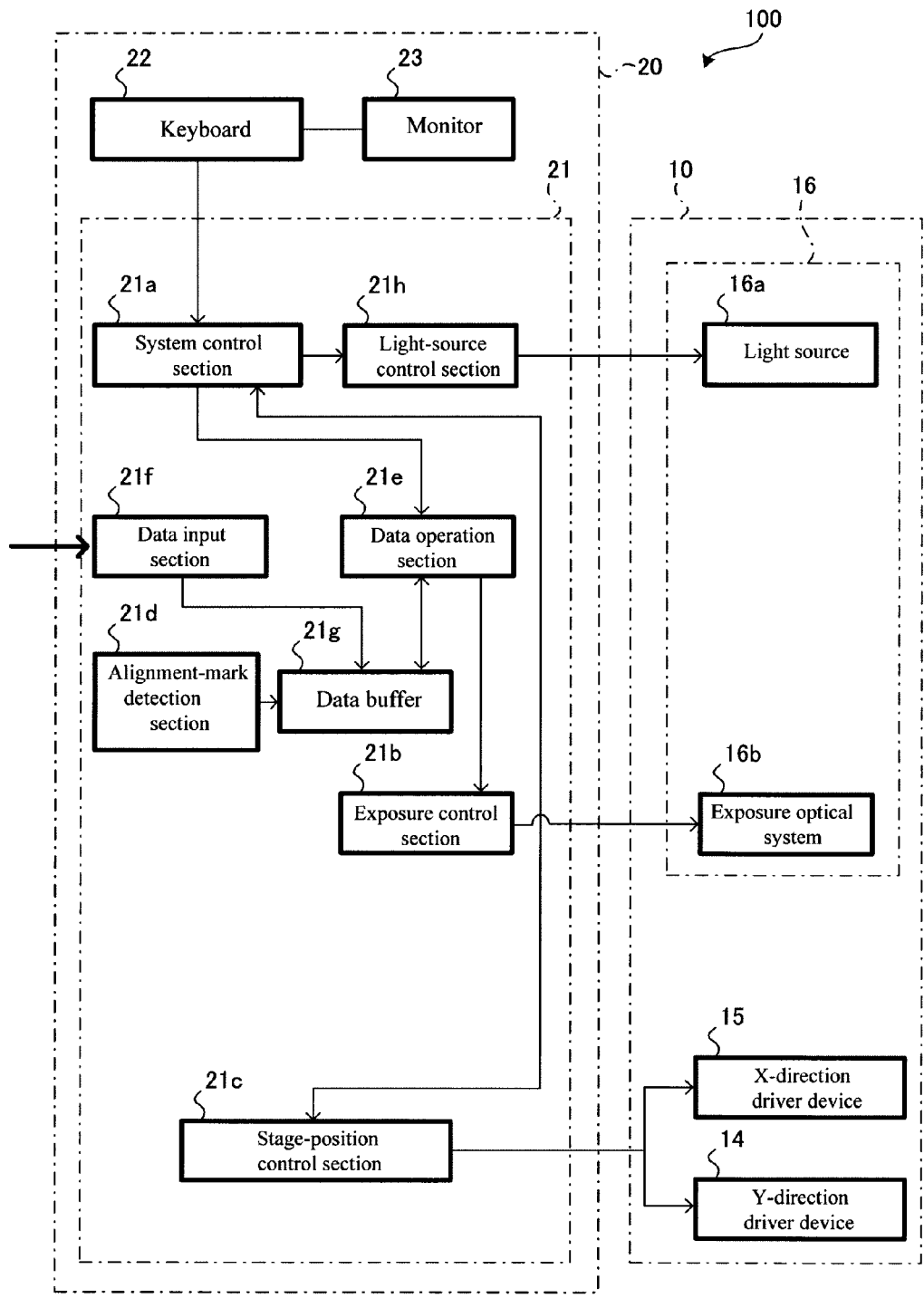
FIG. 1 is a view schematically showing an image rendering system relating to an embodiment of the present invention.

The embodiments will now be described with reference to the accompanying drawings, wherein like reference numerals designate corresponding or identical elements throughout the various drawings.

In the drawings, arrows (Z1, Z2) each indicate a direction along a normal line (or a direction of the thickness of a substrate) to the main surfaces (upper and lower surfaces) of a substrate. On the other hand, arrows (X1, X2) and (Y1, Y2) each indicate a direction parallel to main surfaces of the substrate. The main surfaces of the substrate are on the X-Y plane. Side surfaces of the substrate are on the X-Z plane or the Y-Z plane. In the present embodiment, two main surfaces facing opposite directions of a normal line are referred to as a first surface (the surface on the arrow-Z1 side) and a second surface (the surface on the arrow-Z2 side).

"Arranged in the image rendering region" includes situations in which base positions are set outside the image rendering region along with situations in which base positions are set inside the image rendering region. It is sufficient if base positions are set in relation to an image rendering region.

Also, "displacement state" includes not only the degree of displacement, but the direction of displacement, distortion distribution and so forth.

Figure 2:
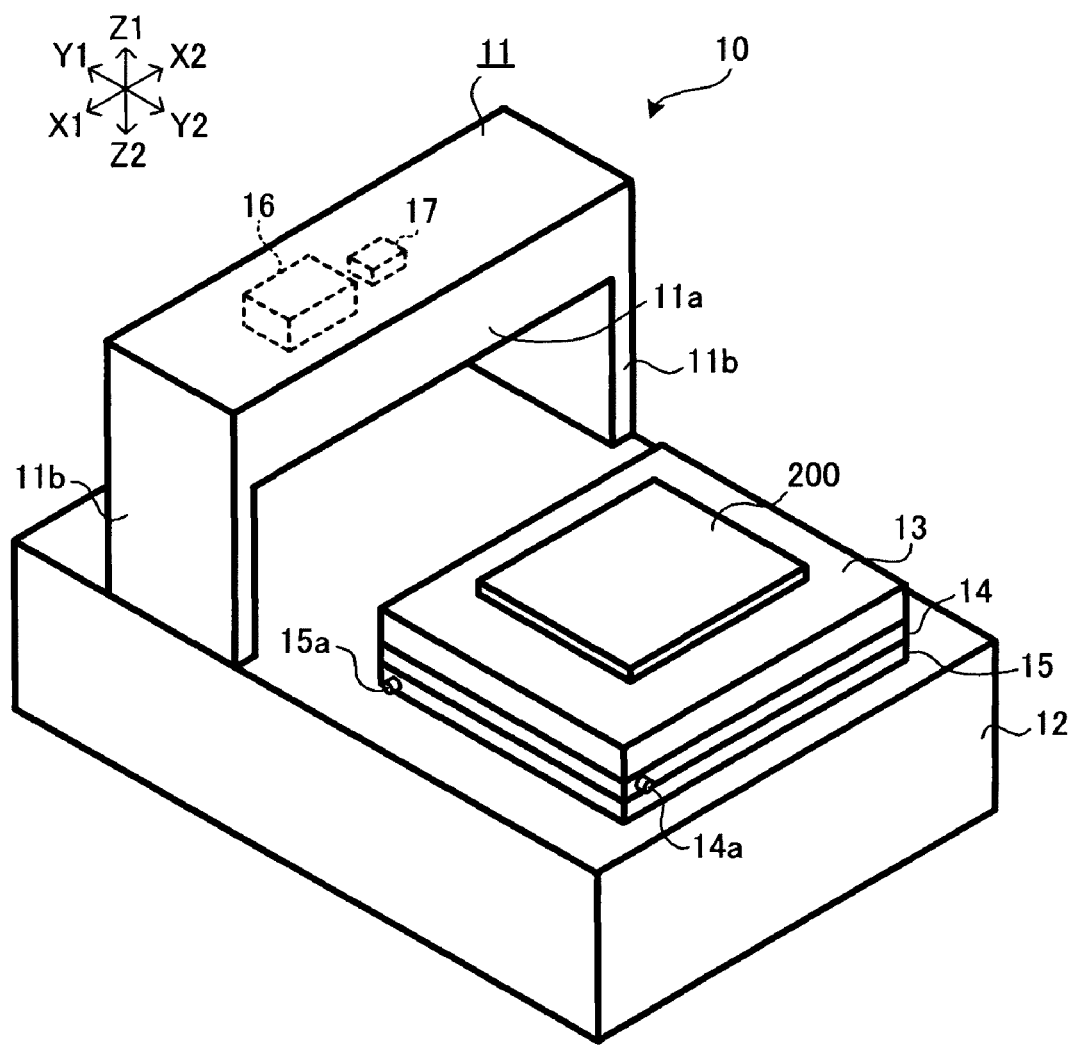
FIG. 2 is a view schematically showing an image rendering apparatus.

As shown in FIG. 1, image rendering system 100 has image rendering apparatus 10 and image rendering control section 20. FIG. 2 schematically shows image rendering apparatus 10.

Image rendering apparatus 10 has gate 11, stand 12, X-Y stage 13, X-direction driver device 15, Y-direction driver device 14, exposure device 16 and camera 17. Image rendering apparatus 10 forms a solder-resist layer or the like on a surface of substrate 200 by rendering an image on substrate 200 (an image rendering object) placed on X-Y stage 13.

X-direction driver device 15 and Y-direction driver device 14 are placed in that order on stand 12. X-Y stage 13 is placed on Y-direction driver device 14, and substrate 200 after a predetermined treatment has been conducted is placed on X-Y stage 13. Y-direction driver device 14 and X-direction driver device 15 have motors (omitted from the drawings), for example. Y-direction driver device 14 has adjustment screw (14a) and X-direction driver device 15 has adjustment screw (15a). When adjustment screws (14a, 15a) are rotated, Y-direction driver device 14 transports X-Y stage 13 along directions Y, and X-direction driver device 15 transports X-Y stage 13 along directions X.

Gate 11 is formed with upper section (11a) and wall section (11b). In upper section (11a), exposure device 16 is arranged. As shown in FIG. 1, exposure device 16 has light source (16a) and exposure optical system (16b). Light source (16a) is made of a semiconductor laser, for example. Exposure optical system (16b) is formed with a DMD (Digital Micro-mirror Device) or the like. However, a light modulator element is not limited to a DMD, and an LCD (Liquid Crystal Display) or an AOM (Acoustic Optical Modulator) may also be used. Exposure device 16 operates in response to the movement of X-Y stage 13. In the present embodiment, main scanning directions are referred to as directions X, and sub-scanning directions as directions Y.

In upper section (11a) of gate 11, camera 17 is also arranged. Camera 17 is made of a CCD (Charge Coupled Device), a CMOS (Complementary Metal Oxide Semiconductor) or the like, for example. Camera 17 is used to detect the positions of alignment marks formed in substrate 20, for example. Camera 17 operates in response to the movement of X-Y stage 13.

As shown in FIG. 1, image rendering control section 20 has control device 21, keyboard 22 and monitor 23. Image rendering control section 20 controls the movement of X-Y stage 13 and functions of exposure device 16. By operating keyboard 22, exposure conditions or the like of exposure device 16 may be entered in control device 21.

Control device 21 has system control section (21a), exposure control section (21b), stage-position control section (21c), alignment-mark detection section (21d), data operation section (21e), data input section (210, data buffer (21g) and light-source control section (21h).

System control section (21a) includes a CPU, RAM, ROM or the like. System control section (21a) controls the entire image rendering apparatus 10. Exposure conditions or the like of exposure device 16 are set in system control section (21a). Stage-position control section (21c) controls functions of Y-direction driver device 14 and X-direction driver device 15 (such as the movement amount and movement speed of X-Y stage 13), while detecting the positions of areas to be exposed relative to X-Y stage 13. Exposure control section (21b) controls functions (such as exposure timing) of exposure optical system (16b) according to an image processing program loaded in advance in a ROM, for example. Data buffer (21g) is a memory which is capable of temporarily storing data. Light-source control section (21h) controls functions (such as beaming light) of light source (16a).

Figure 3:
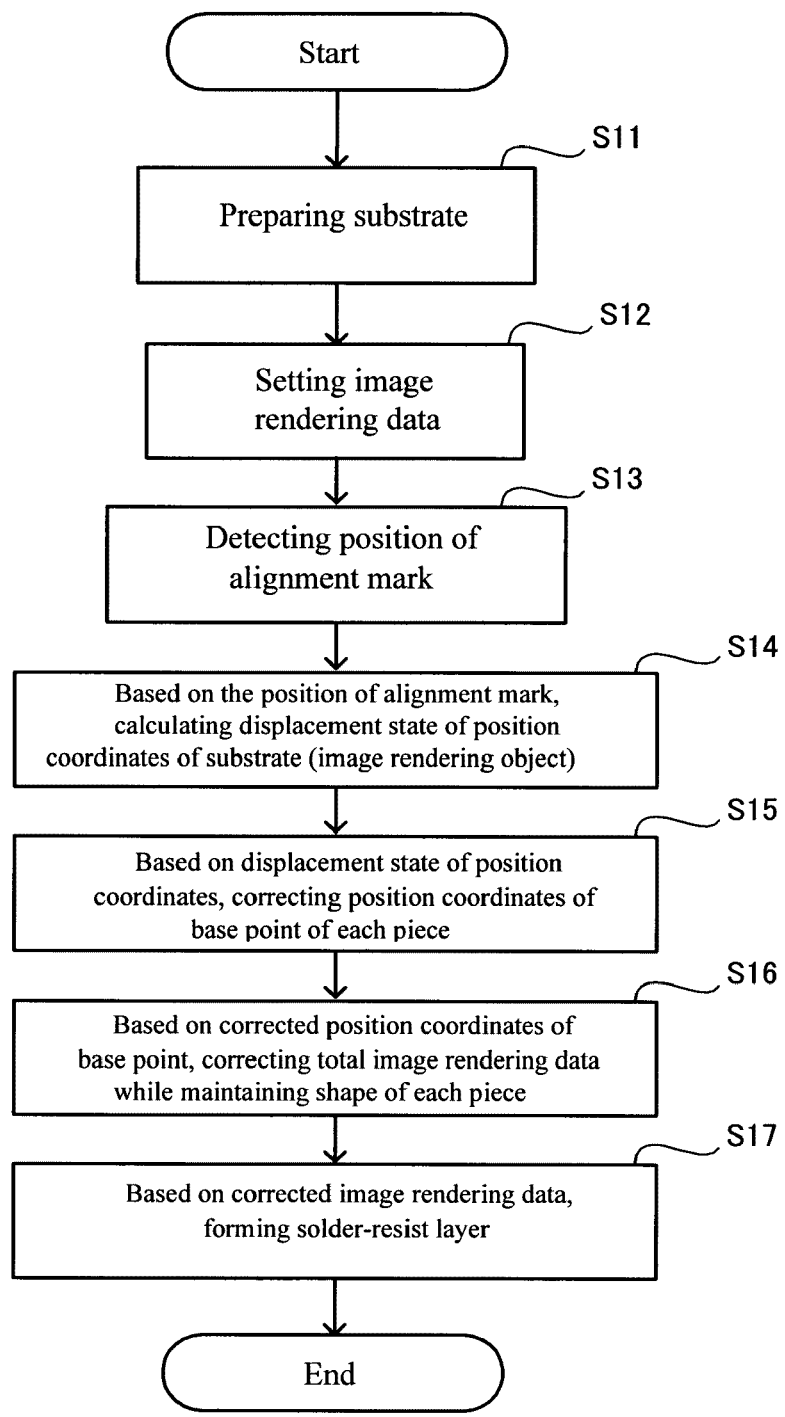
FIG. 3 is a flowchart to illustrate operation of an image rendering system.

Next, the operation of image rendering system 100 is described. Image rendering system 100 carries out procedures such as shown in FIG. 3. Procedures by control device 21 are initiated and processed by the CPU, which runs the program in the ROM, for example. The image rendering data in the present embodiment are patterned data in a solder-resist layer. However, the image rendering data are not limited to such and may be any other type. Also, as for substrate 200 (an image rendering object), for example, silicon wafer, film, glass board, or copper-clad laminate for a printed wiring board or a printed circuit board or the like may be used. Substrate 200 of the present embodiment is a printed circuit board for obtaining multiple units and has multiple pieces.

Figure 4:
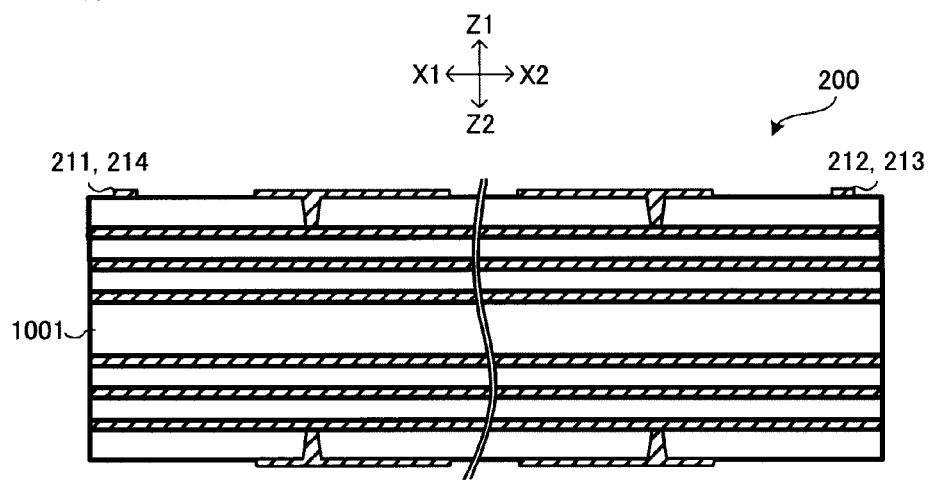
FIG. 4 is a cross-sectional view of a substrate.

First, substrate 200 is prepared in step (S11). As shown in FIG. 4, for example, substrate 200 is formed with core substrate 1001, interlayer insulation layers and conductive layers alternately laminated on both the upper and lower surfaces of core substrate 1001. When forming the conductive layers, alignment marks (211-214) are formed simultaneously. Alternatively, parts of the conductive layers are used as alignment marks (211-214). Substrate 200 is deformed (expansion/contraction) because, for example, forces are exerted on substrate 200 due to etching when conductive layers are formed. Before deformation, positions of alignment marks (211-214) correspond to the positions of image rendering data (alignment marks (P1-P4) described later). However, after deformation, their positions will deviate.

Next, in step (S12) of FIG. 3, control device 21 sets image rendering data. More specifically, a workstation is operated, for example, and the image rendering data are entered in data input section (210 of control device 21. Accordingly, image rendering data are stored in data buffer (21g).

The image rendering data entered here are vector data (CAM data), for example. Vector data have position coordinate data of an image rendering pattern based on X-Y coordinates. Therefore, in such image rendering data, positions on substrate 200 are determined based on X-Y coordinates.

Figure 5:
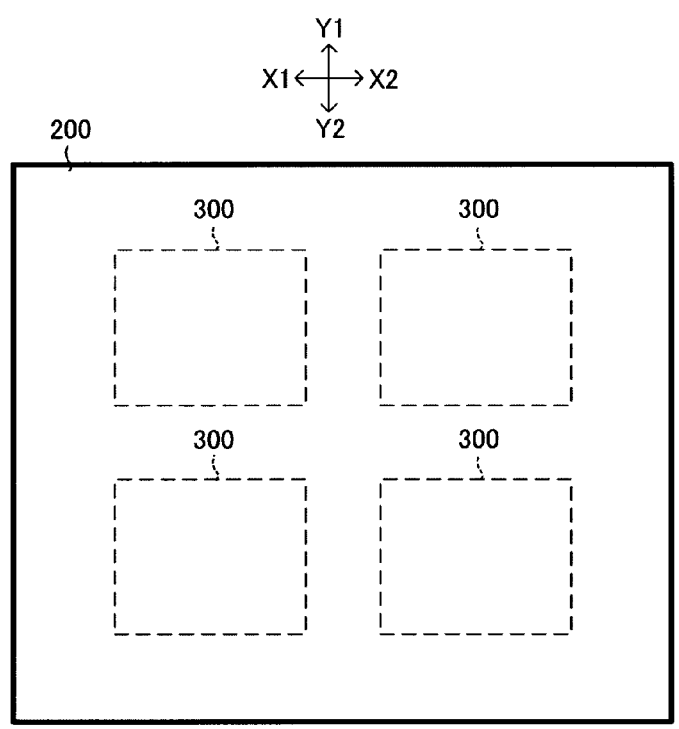
FIG. 5 is a view to illustrate a step for setting (preparing) image rendering data.
Figure 6:
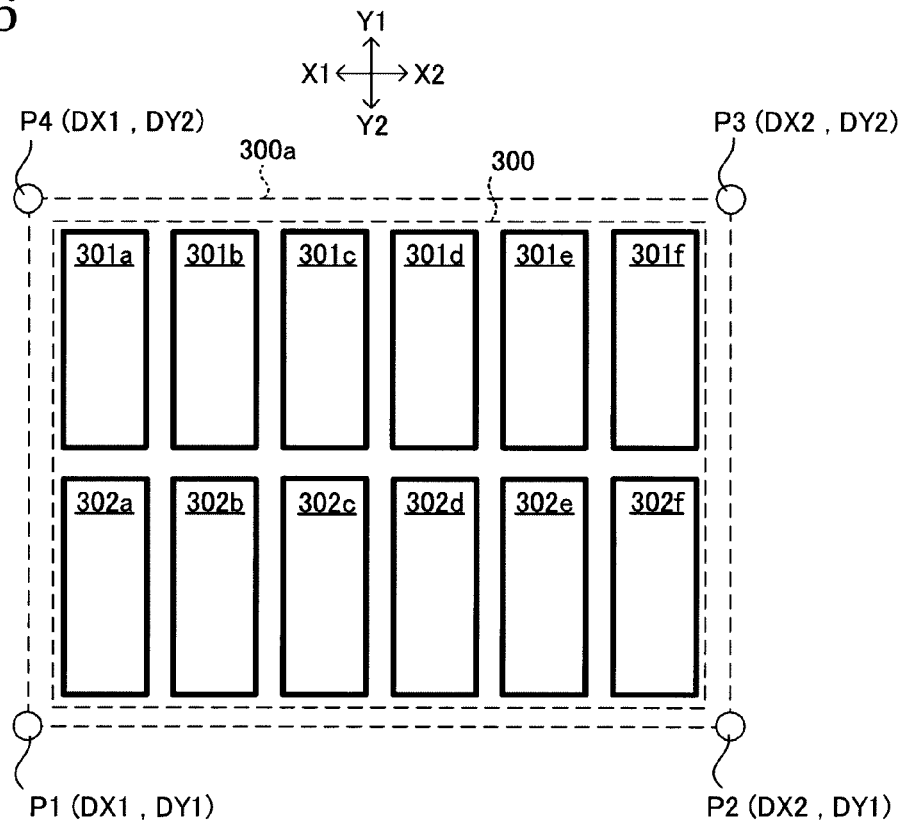
FIG. 6 is a magnified view of an image rendering region.

Through the process in step (S12) of FIG. 3, four image rendering regions 300 are prepared on a main surface of substrate 200 as shown in FIG. 5. The shape of each image rendering region 300 is rectangular, for example, having sides parallel to axis X or axis Y. FIG. 6 shows a magnified view of one image rendering region 300 among four image rendering regions 300 on a main surface of substrate 200. On the periphery of each image rendering region 300, alignment marks (P1-P4) are arranged. Alignment marks (P1-P4) are vertices of rectangle (300a) with a size greater than that of image rendering region 300. Image rendering region 300 is formed with multiple pieces (301a-301f, 302a-302f). Pieces (301a-302f) are set regularly in directions X and directions Y with the same shape (rectangle) as each other. Among pieces (301a-302f), a predetermined clearance is formed between adjacent pieces.

Figure 7:
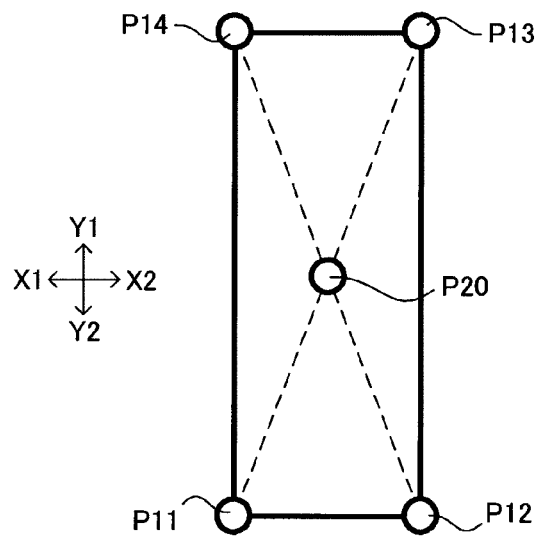
FIG. 7 is a magnified view of a piece.

FIG. 7 shows a magnified view of one of pieces (301a-302f). The shapes of pieces (301a-302f) are each rectangular having sides parallel to axis X or axis Y, for example. Base point (P20) is prepared in each of pieces (301a-302f). Base point (P20) is set at the gravity center of each of pieces (301a-302f).

Image rendering data have position coordinates that determine each of pieces (301a-302f) (hereinafter referred to as piece position coordinates), position coordinates that show the position of base point (P20) in each of pieces (301a-302f) (hereinafter referred to as base position coordinates), and position coordinates (DX1, DY1), (DX2, DY1), (DX2, DY2) and (DX1, DY2) that show the positions of alignment marks (P1-P4) (hereinafter referred to as first-alignment position coordinates). Piece position coordinates of the present embodiment correspond to the position coordinates of vertices (P11-P14) in each piece (FIG. 7). Also, first-alignment position coordinates correspond to the position coordinates of vertices (alignment marks (P1-P4)) in rectangle (300a) (FIG. 6).

Figure 8:
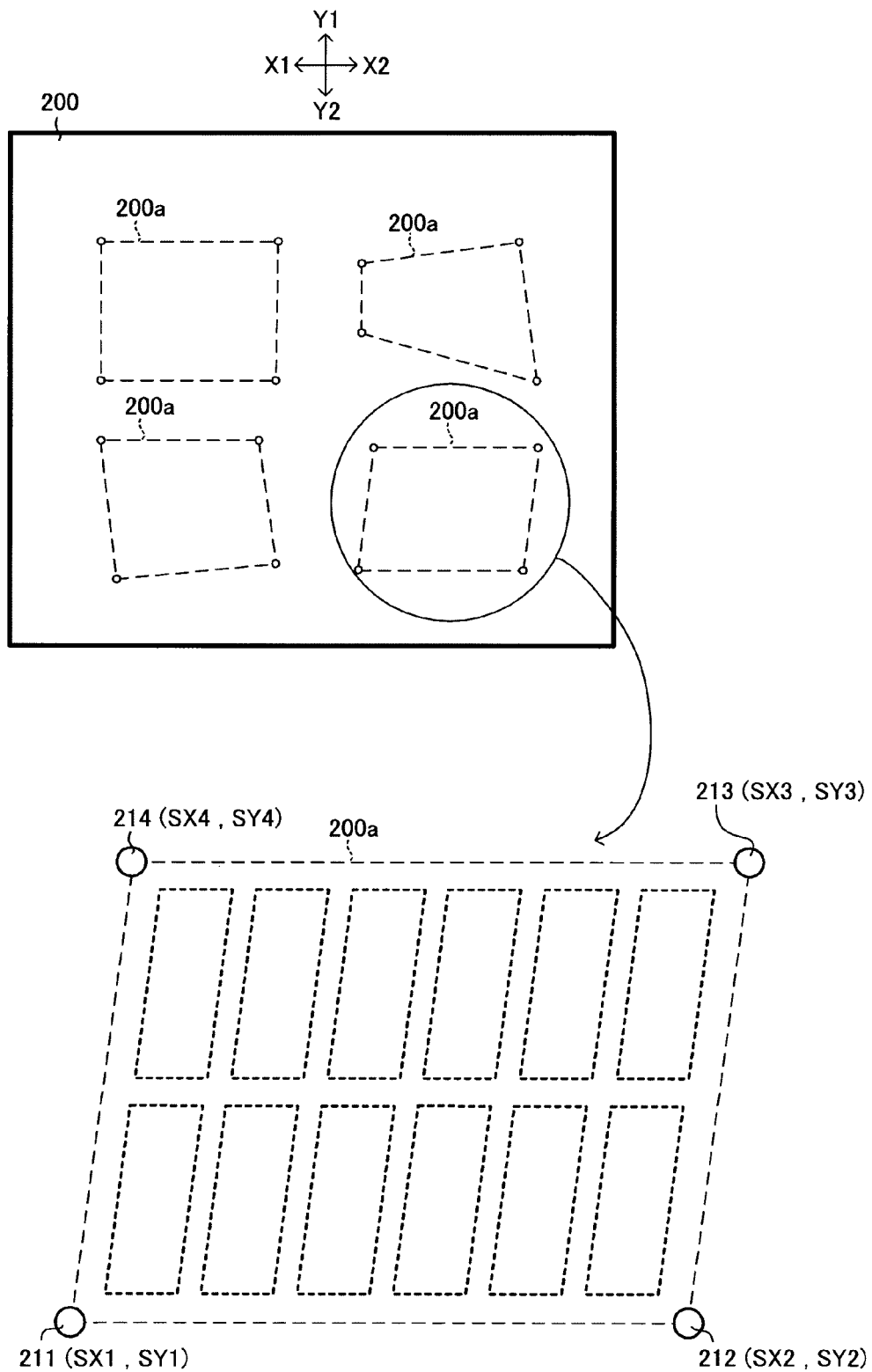
FIG. 8 are views showing substrates after deformation.

As shown in FIG. 8, for example, substrate 200 is deformed. Rectangle (200a) on substrate 200 is a region corresponding to rectangle (300a) (FIG. 6) in the image rendering data. In the next step (S13) of FIG. 3, position coordinates (SX1, SY1), (SX2, SY2), (SX3, SY3) and (SX4, SY4) of alignment marks (211-214) in deformed substrate 200 are detected (hereinafter referred to as second-alignment position coordinates). In the following, a case is described as an example in which position coordinates of image rendering region 300 are displaced only in direction X (the arrow-X2 side).

In the present embodiment, alignment-marks detection section (21d) detects the above second-alignment position coordinates based on detection signals from camera 17. After that, second-alignment position coordinates are stored in data buffer (21g). Because substrate 200 is deformed, first-alignment position coordinates and second-alignment position coordinates deviate from each other.

Next, in step (S14) of FIG. 3, based on differences between first-alignment position coordinates and second-alignment position coordinates, namely, the amount of deviation (the amount of displacement of position coordinates), the displacement state of position coordinates in substrate 200 is obtained.

Figure 9:
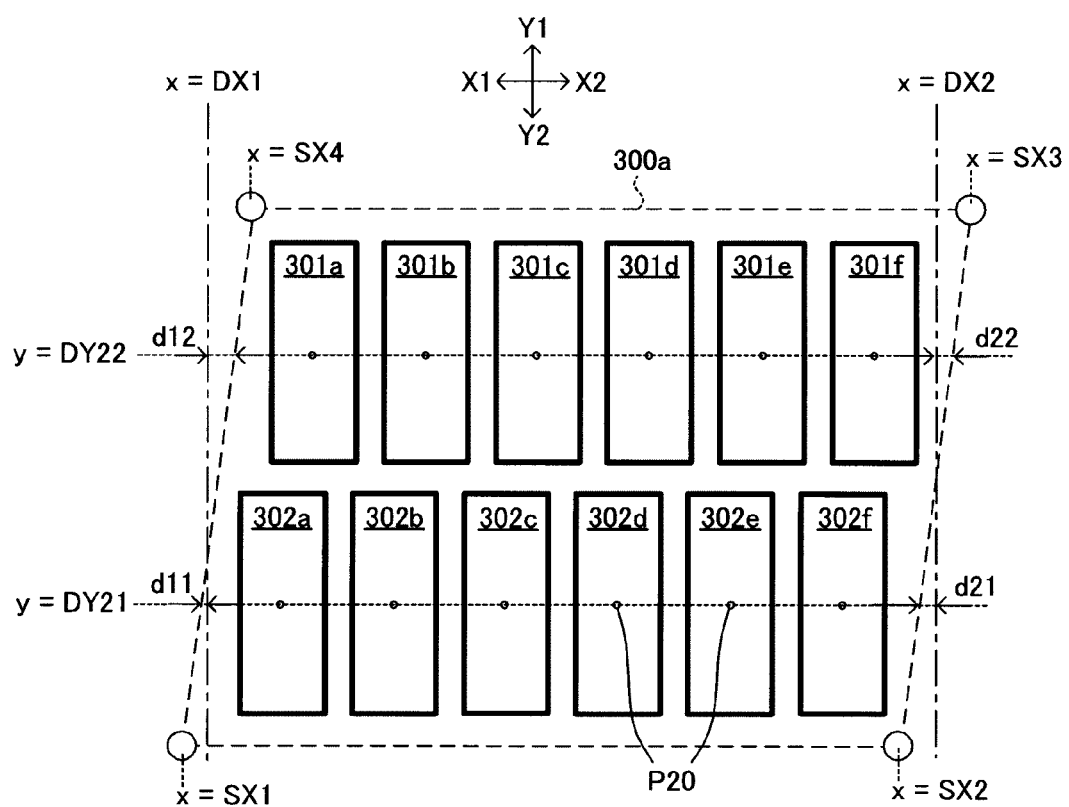
FIG. 9 is a view showing a step for obtaining the displacement state of position coordinates on an image rendering object, and a step for correcting base position coordinates of each piece.

For example, as shown in FIG. 9, Y coordinates of base points (P20) of pieces (301a-301f) and pieces (302a-302f) are set as Y coordinates (DY21) and (DY22) respectively. Also, regarding the amount of deviation between rectangle (200a) and rectangle (300a), the deviation amounts along arrows (X1, X2) at Y coordinate (DY21) are set as deviation amounts (d11, d21) respectively; and the deviation amounts along arrows (X1, X2) at Y coordinate (DY22) are set as deviation amounts (d12, d22) respectively.

In the present embodiment, data operation section (21e) calculates average value (A1) of deviation amounts (d11) and (d21) and average value (A2) of deviation amounts (d12) and (d22) as the displacement state of position coordinates in substrate 200. After that, average values (A1, A2) are stored in data buffer (21g). Obtaining the displaced state is not limited to any specific method. For example, through computer analysis based on a finite element method, the displacement state of each section of substrate 200 may also be accurately calculated.

Next, in step (S15) of FIG. 3, from data buffer (21g), data operation section (21e) reads the displacement state (average values (A1, A2)) of position coordinates in substrate 200 which were corrected in step (S14), and corrects position coordinates of each base point (P20) in pieces (301a-302f) based on such average values (A1, A2). More specifically, as shown in FIG. 9, position coordinates (base position coordinates) of each base point (P20) in pieces (301a-301f) and pieces (302a-302f) are displaced along direction X (the arrow-X2 side) by average values (A1, A2) respectively. Accordingly, the base point coordinates of each of pieces (301a-302f) will be corrected. The base position coordinates after such correction will be respectively stored in data buffer (21g).

Next, in step (S16) of FIG. 3, data operation section (21e) reads the base position coordinates corrected in step (S15). Then, according to such base position coordinates, all the image rendering data, namely, position coordinates of pieces (301a-302f), are corrected while the shape (rectangle) of each of pieces (301a-302f) is maintained.

Figure 10:
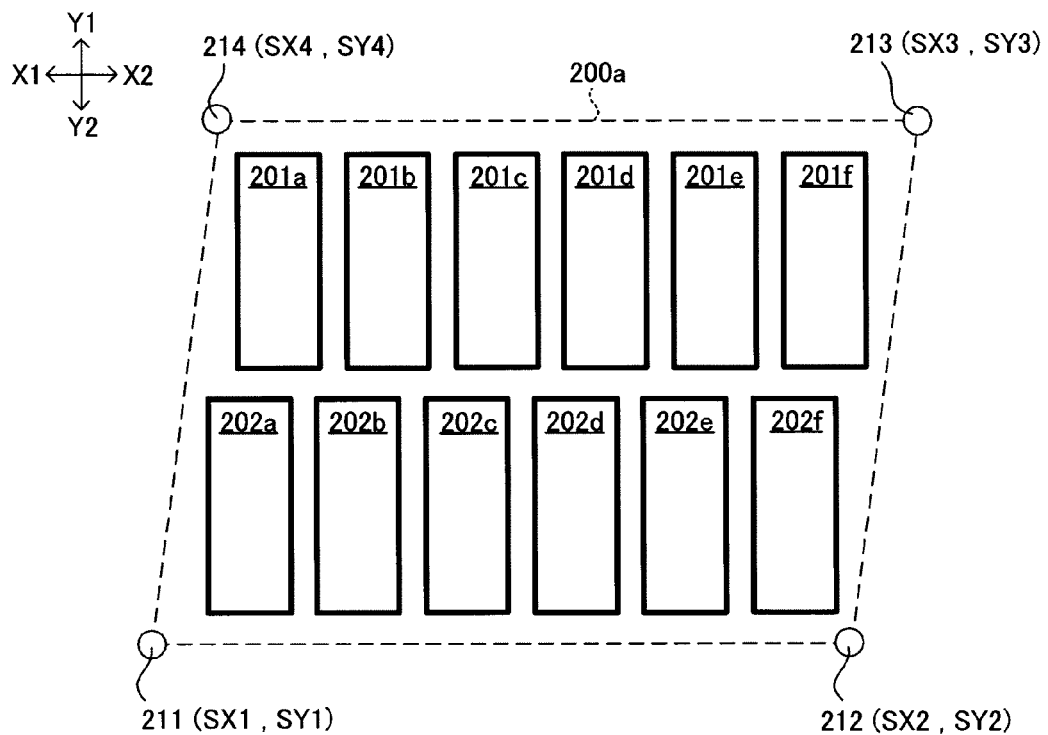
FIG. 10 is a view to illustrate a step for forming solder-resist layers on the substrate.
Figure 11:
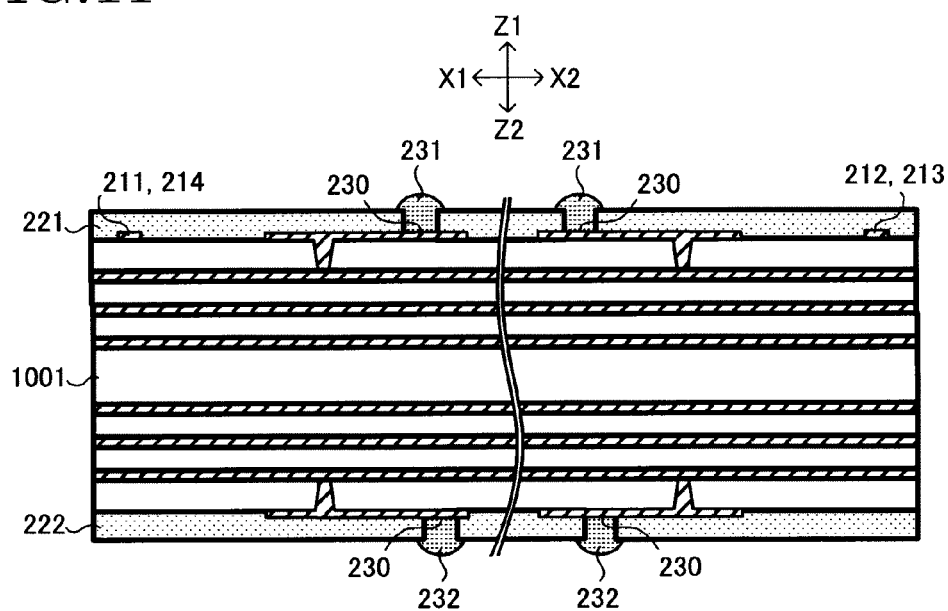
FIG. 11 is a cross-sectional view of FIG. 10.

Next, in step (S17) of FIG. 3, images of multiple pieces (201a-201f, 202a-202f) are rendered on substrate 200 based on the image rendering data corrected in step (S16). More specifically, liquid photosensitive resin is applied on the entire first surface of substrate 200. Then, after substrate 200 is exposed to light at exposure device 16 without using a photomask, uncured resin is removed. The same process is conducted on the second surface of substrate 200. Accordingly, as shown in FIG. 10 and FIG. 11 (cross-sectional view of FIG. 10), solder-resist layers (221, 222) are formed on the first and second surfaces of substrate 200. During that time, parts of outermost-layer conductive circuits are exposed in solder-resist layers (221, 222) and multiple mounting pads 230 are formed. Then, by forming solder bumps (231, 232) on mounting pads 230, wiring boards are completed. The material and size of each layer and the number of layers in the wiring boards are not limited to anything specific. Since multiple wiring boards are formed in one substrate 200, each wiring board will be cut out from substrate 200 after the wiring boards are formed. At that time, multiple wiring boards may be cut out in bulk from substrate 200. Alternatively, each wiring board may be cut out separately from substrate 200.

According to a method for correcting image rendering data of the present embodiment, when substrate 200 is deformed, by reducing the deviation between the shape of substrate 200 assumed in the image rendering data and the actual shape of substrate 200, rendering an image closer to the actual shape of substrate 200 is accomplished. More specifically, by correcting the position coordinates of base point (P20) in each of pieces (301a-302f), position coordinates of each of pieces (301a-302f) will be changed according to the deformation of substrate 200. As a result, the deviation is reduced between the image rendering region in each of pieces (301a-302f) assumed in the image rendering data and the actual image rendering region in each of pieces (301a-302f) on substrate 200.

In step (S16) of FIG. 3, while the shape of each of pieces (301a-302f) is maintained, the position coordinates will be corrected. Patterned data in solder-resist layers (221, 222), which are the rendered image data, include the positional data of multiple mounting pads 230. The positions of mounting pads 230 respectively correspond to the positions of multiple electrodes in a chip to be mounted on the wiring board. Also, the pitch of mounting pads 230 respectively correspond to the pitch of the electrodes. In step (S16), since the shape of each of pieces (301a-302f) is maintained, the position of each mounting pad 230 is maintained as the set value. Accordingly, the pitch of mounting pads 230 to be formed will also be maintained as the set value, respectively corresponding to the pitch of the electrodes in the chip. As a result, mounting the chip onto the wiring board will be easy.

Also, in the present embodiment, alignment marks (P1-P4) are prepared in each of multiple image rendering regions 300, and the position coordinates of the pieces are corrected in each of image rendering region 300. Then, based on the corrected image rendering data, an image will be rendered in each rectangle (200a) on substrate 200. Accordingly, compared with a case in which alignment marks are set in one image rendering region where multiple image rendering regions 300 are gathered, the accuracy of correcting the position coordinates of the pieces is improved.

Figure 12:
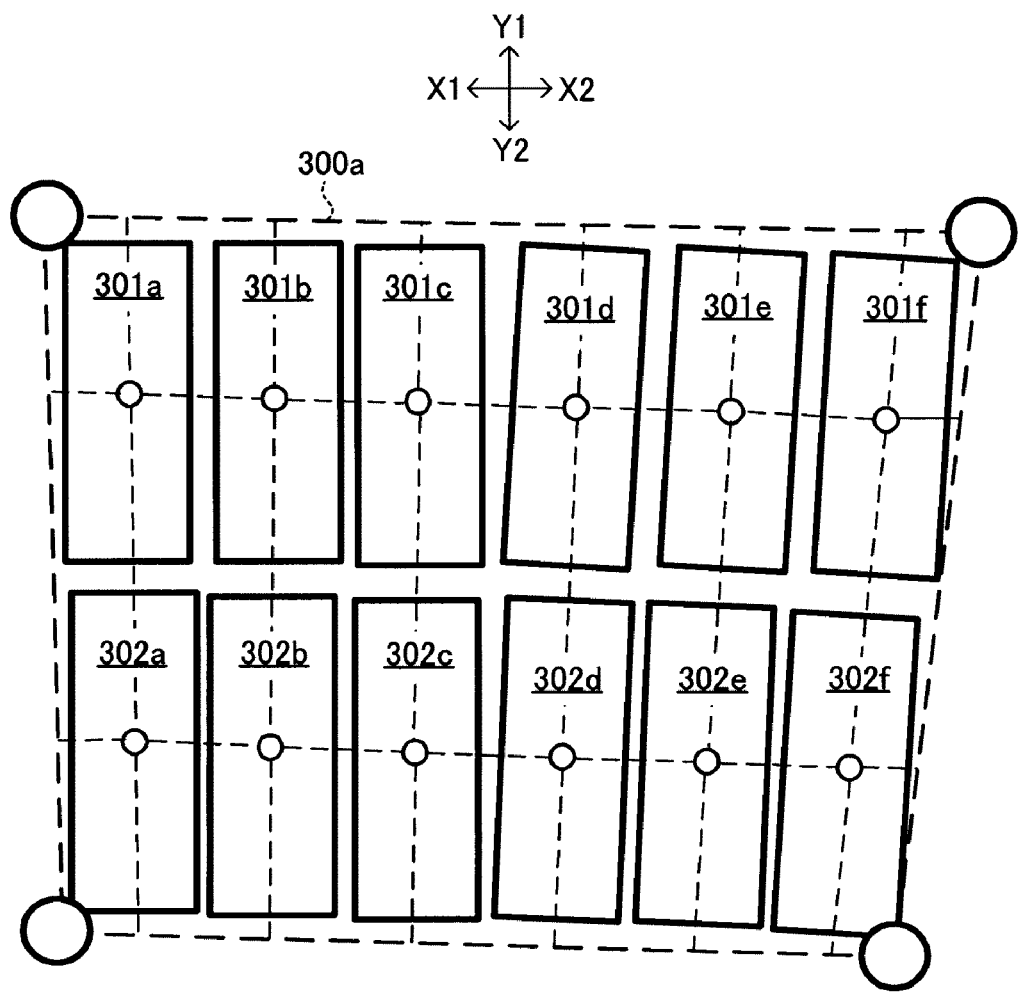
FIG. 12 is a view showing an example of a corrected state in a situation when a substrate is displaced in a rotation direction.

In the present embodiment, a case was described as an example in which position coordinates of substrate 200 are displaced only in directions X. However, the same procedure may be applied when position coordinates are displaced in directions Y. Also, when position coordinates are displaced in both directions X and Y, positions may be corrected in the same manner for each direction. Alternatively, for example, as shown in FIG. 12, when position coordinates are displaced in a rotational direction, positions may also be corrected based on a predetermined formula or the like in regard to rotational moment. In such a case, solder-resist layers (221, 222) are formed so that their shapes are maintained while their directions are rotated in response to the displaced direction of substrate 200.

So far, a method for correcting image rendering data, a method for rendering an image, and a method for manufacturing a wiring board and an image rendering system have been described according to an embodiment of the present invention. However, the present invention is not limited to the above embodiment. For example, the present invention may be carried out through the following modifications.

Figure 13:
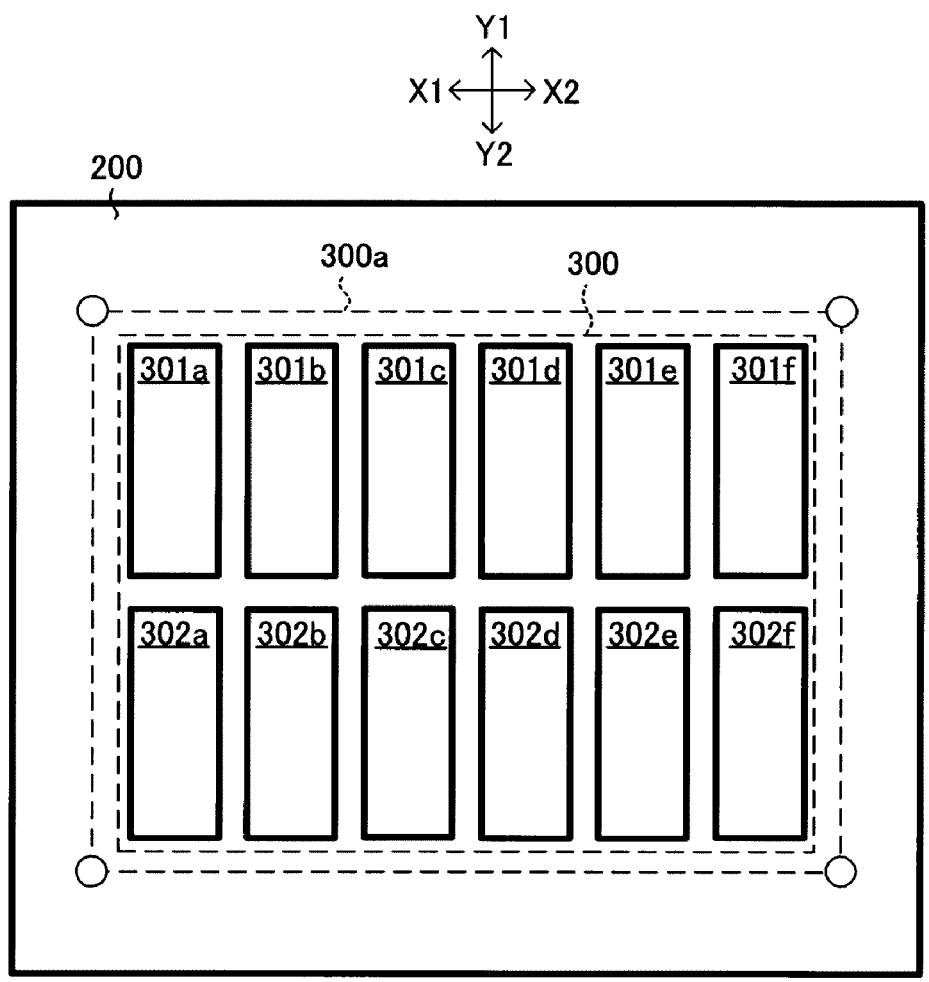
FIG. 13 is a view showing an example of image rendering data having one image rendering region.

In the present embodiment, multiple image rendering regions 300 are set on a main surface of substrate 200. However, as shown in FIG. 13, for example, one image rendering region 300 may be set on a main surface of substrate 200.

Figure 14:
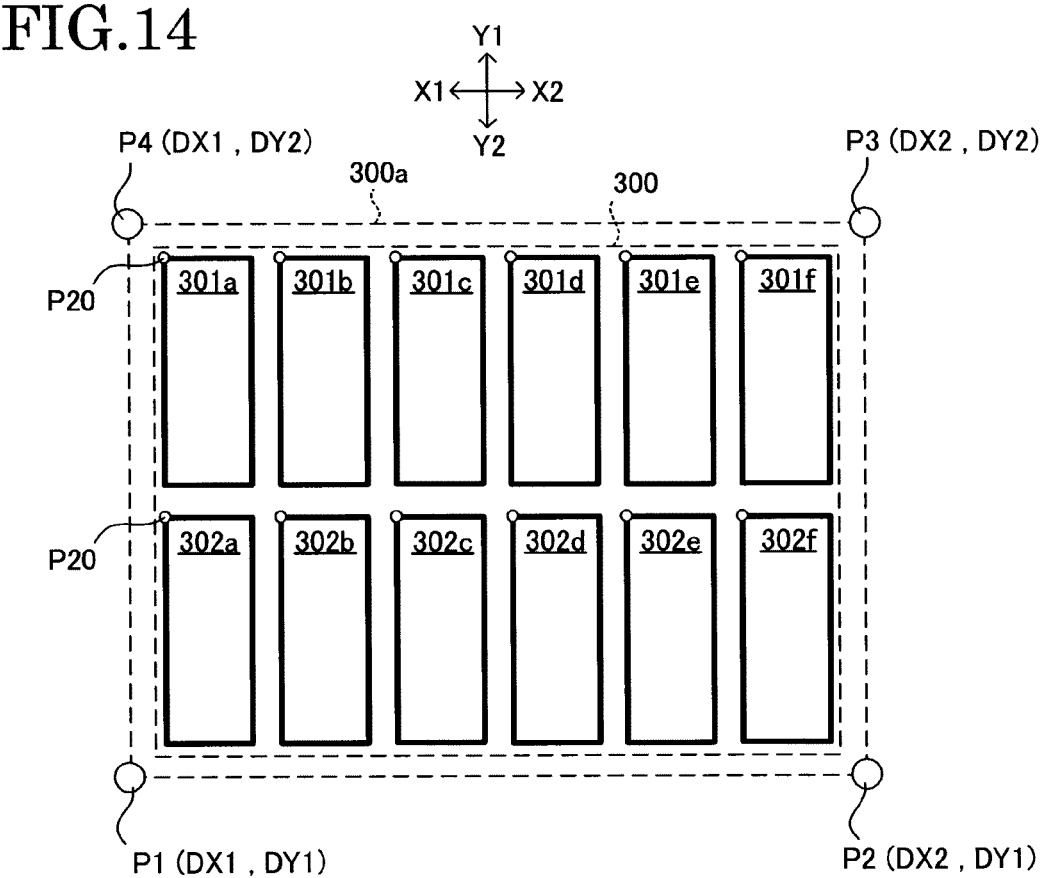
FIG. 14 is a view showing an example of image rendering data where a base point is set on a vertex of a piece.

The position of base point (P20) is not limited to the gravity center of a piece, and may be set in any other position. For example, as shown in FIG. 14, base point (P20) may be set at a vertex of each of pieces (301a-302f). In addition, the number of base points (P20) is not limited to one, and multiple base points (P20) may be set in each of pieces (301a-302f). By setting multiple base points (P20), when substrate 200 is displaced in a rotational direction, the rotational direction is easy to calculate.

Figure 15:
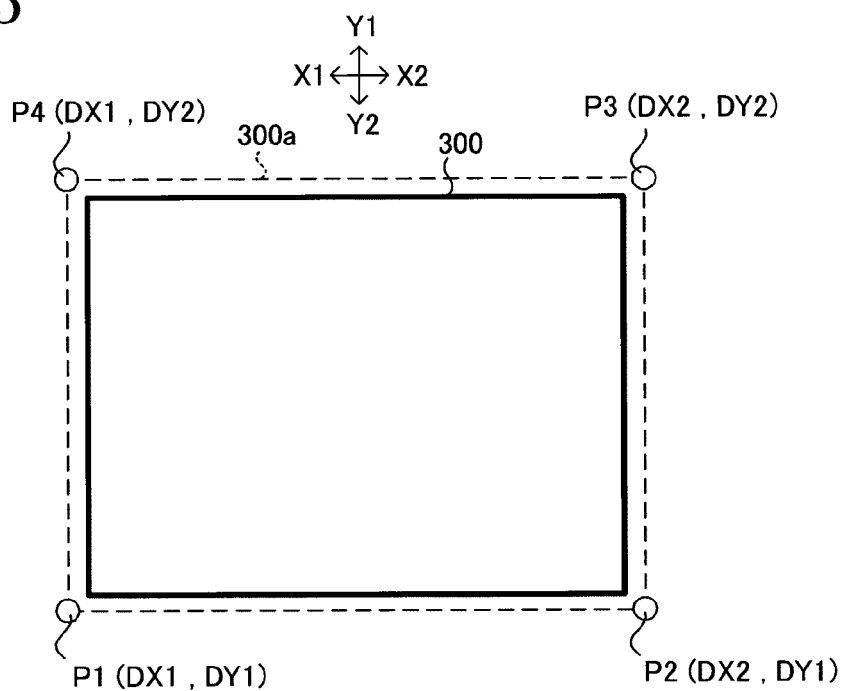
FIG. 15 is a view showing an example where an image rendering region is not divided into pieces.

In the present embodiment, image rendering region 300 having multiple pieces (301a-301f, 302a-302f) is considered. However, the number of pieces is not limited to any specific number. Also, as shown in FIG. 15, image rendering region 300 is not required to be divided into pieces. Alternatively, as shown in FIGS. (16, 17), image rendering region 300 may be divided into a greater number of pieces, namely, pieces (301a-301f, 302a-302f, 303a-303f, 304a-304f).

Figure 16:
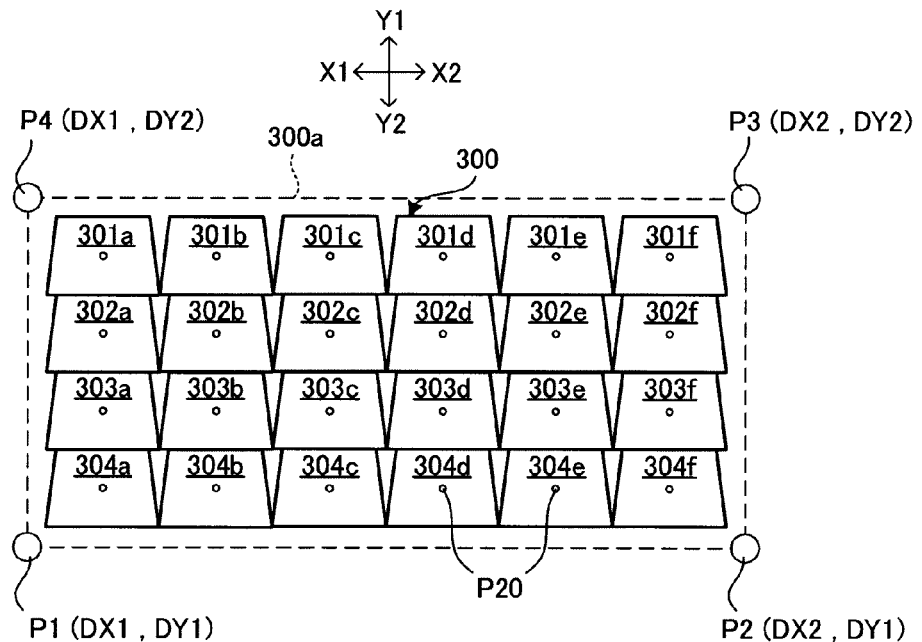
FIG. 16 is a view showing trapezoidal pieces.
Figure 17:
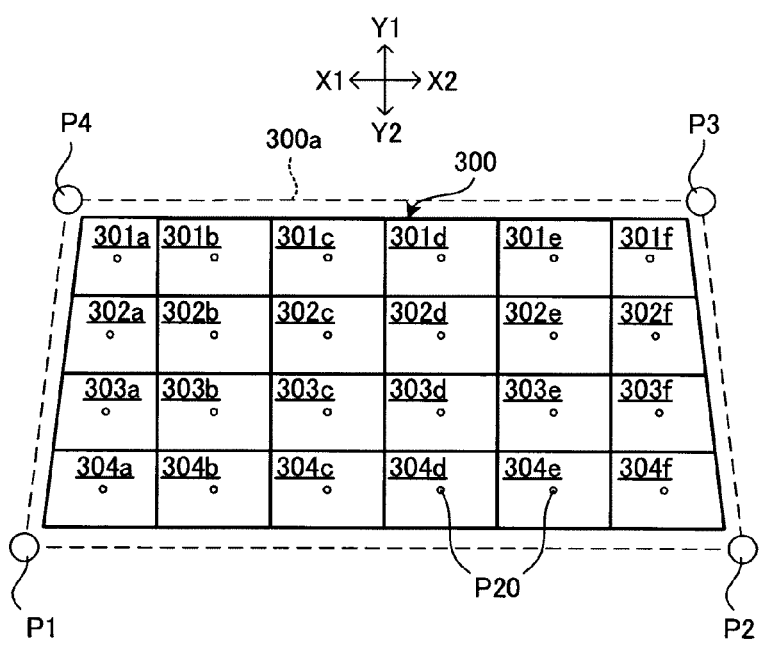
FIG. 17 is a view showing an example of an image rendering region made up of differently shaped pieces.

The shape of pieces is not limited to a rectangle, and any other shape may be employed. For example, as shown in FIG. 16, the shape of pieces may be a quadrilateral other than a rectangle, namely, a trapezoid. Alternatively, the shape of pieces may also be a circle or other shapes with multiple sides (such as a triangle or pentagon). Yet alternatively, as shown in FIG. 17, each piece may be shaped differently.

Figure 18:
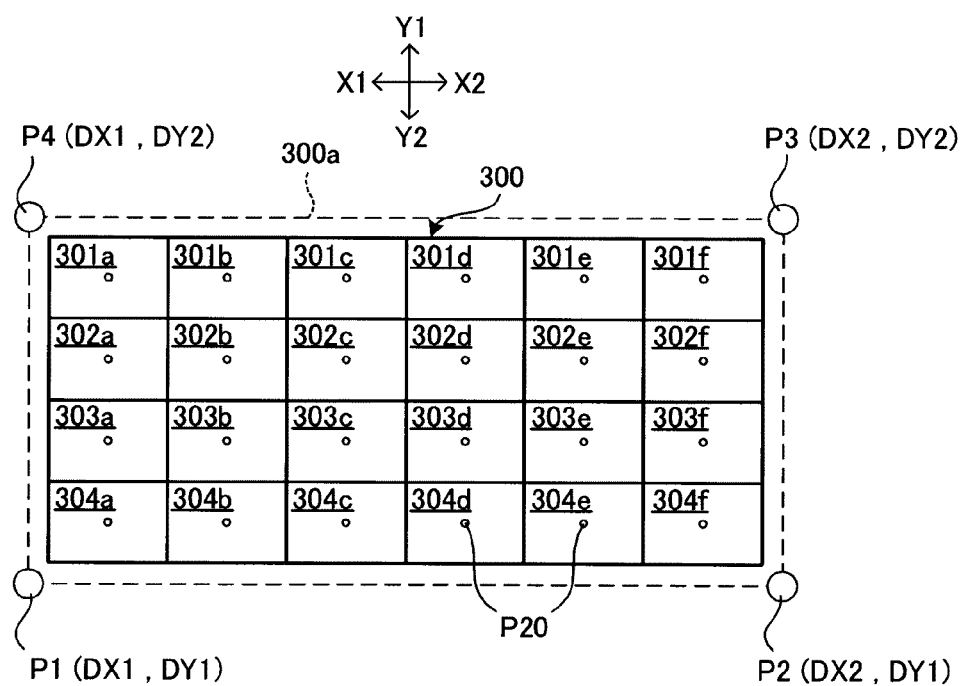
FIG. 18 is a view showing an example where adjacent pieces share vertices.

Positioning pieces is not limited specifically. For example, as shown in FIG. 18, among pieces (301a-304f), adjacent pieces may share their vertices.

Positions of alignment marks (P1-P4) (FIG. 6) are not limited to the vertices of a rectangle, and may be at any other points. For example, alignment marks (P1-P4) may be arranged inside image rendering region 300.

Regarding other factors, structures of image rendering apparatus 10, image rendering control section 20 and so forth may be modified freely within a scope that will not deviate from the gist of the present invention.

The order and contents of the procedure in the above embodiment may be modified freely within a scope that will not deviate from the gist of the present invention. Also, some steps may be omitted according to usage requirements or the like. For example, corrections may also be made based on image rendering data other than vector data.

Obviously, numerous modifications and variations of the present invention are possible in light of the above teachings. It is therefore to be understood that within the scope of the appended claims, the invention may be practiced otherwise than as specifically described herein.

What is claimed is:

1. A method for correcting image rendering data, comprising:
preparing image rendering data having position coordinates that determine an image rendering region on an image rendering object, and having base position coordinates that show a position of a base point arranged in the image rendering region on the image rendering object;
after a physical deformation of the image rendering object, using a CPU to perform obtaining a displacement state of the position coordinates on the image rendering object;

correcting the base position coordinates based on the displacement state of the position coordinates on the image rendering object; and correcting the position coordinates of the image rendering region based on the base position coordinates, while maintaining a shape of the image rendering region.

2. The method for correcting image rendering data according to claim 1, wherein:

the image rendering object has an alignment mark, the image rendering data have first-alignment position coordinates that show a position of the alignment mark before the image rendering object is deformed, and the obtaining of the displacement state of the position coordinates on the image rendering object includes detecting second-alignment position coordinates that show the position of the alignment mark after the image rendering object is deformed and includes obtaining the displacement state of the position coordinates on the image rendering object based on a deviation between the first-alignment position coordinates and the second-alignment position coordinates.

3. The method for correcting image rendering data according to claim 2, wherein the shape of the image rendering region is a quadrilateral, and the first-alignment position coordinates correspond to vertices of a quadrilateral greater in size than the quadrilateral of the image rendering region.

4. An image rendering method comprising rendering an image on an image rendering object based on the image rendering data corrected according to the method for correcting image rendering data according to claim 1.

5. A method for manufacturing a wiring board having a pad for mounting an electronic component comprising forming a solder-resist layer according to the image rendering method according to claim 4.

6. An image rendering system, comprising:

an image-rendering-data setting device which sets image rendering data having position coordinates that determine an image rendering region on an image rendering object and base position coordinates that show a position of a base point arranged in the image rendering region on the image rendering object;

a displacement-state determination device which obtains a displacement state of position coordinates on the image rendering object after a physical deformation of the image rendering object;

a base-position-coordinate correction device which corrects the base position coordinates according to the displacement state of the position coordinates on the image rendering object; and a position-coordinate correction device which corrects the position coordinates of the image rendering region according to the corrected base position coordinates while maintaining a shape of the image rendering region.

7. A method for correcting image rendering data, comprising:

preparing image rendering data having position coordinates that determine each of multiple pieces structuring an image rendering region on an image rendering object and base position coordinates that show a base point arranged in each of the pieces on the image rendering object;

after a physical deformation of the image rendering object, using a CPU to perform obtaining a displacement state of the position coordinates on the image rendering object;

correcting the base position coordinates of each of the pieces according to the obtained displacement state of the position coordinates on the image rendering object; and correcting the position coordinates of each of the pieces according to the corrected base position coordinates while maintaining the shape of each of the pieces.

8. The method for correcting image rendering data according to claim 7, wherein:

the image rendering object has an alignment mark, the image rendering data have first-alignment position coordinates that show a position of the alignment mark before the image rendering object is deformed, and the obtaining of the displacement state of the position coordinates on the image rendering object includes detecting second-alignment position coordinates that show the position of the alignment mark after the image rendering object is deformed, and includes obtaining the displacement state of the position coordinates on the image rendering object based on a deviation between the first-alignment position coordinates and the second-alignment position coordinates.

9. The method for correcting image rendering data according to claim 8, wherein the shape of the image rendering region is a quadrilateral, and the first-alignment position coordinates correspond to the vertices of a quadrilateral greater in size than the quadrilateral of the image rendering region.

10. An image rendering method comprising rendering an image on an image rendering object based on the image rendering data corrected according to the method for correcting image rendering data according to in claim 7.

11. A method for manufacturing a wiring board having a pad for mounting an electronic component comprising forming a solder-resist layer according to the image rendering method according to claim 10.

12. An image rendering system, comprising:

an image-rendering-data setting device which sets image rendering data having position coordinates that determine each of a plurality of pieces structuring an image rendering region on an image rendering object and base position coordinates that show a position of a base point arranged in each of the pieces in the image rendering region on the image rendering object;

a displacement-state determination device which obtains a displacement state of position coordinates on the image rendering object after a physical deformation of the image rendering object;

a base-position-coordinate correction device which corrects the base position coordinates of each of the pieces according to the displacement state of the position coordinates on the image rendering object; and a position-coordinate correction device which corrects the position coordinates of each of the pieces according to the base position coordinates while maintaining a shape of each of the pieces.

* * * * *